United States Patent
Kuwahara

(10) Patent No.: US 11,689,946 B2
(45) Date of Patent: Jun. 27, 2023

(54) COMMUNICATION SYSTEM AND COMMUNICATION MANAGEMENT METHOD

(71) Applicant: HITACHI, LTD., Tokyo (JP)

(72) Inventor: Mikio Kuwahara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 17/205,362

(22) Filed: Mar. 18, 2021

(65) Prior Publication Data
US 2021/0297880 A1  Sep. 23, 2021

(30) Foreign Application Priority Data
Mar. 23, 2020  (JP) .................. 2020-051057

(51) Int. Cl.
*H04W 24/08* (2009.01)
*H04W 72/0453* (2023.01)
*H04L 43/10* (2022.01)

(52) U.S. Cl.
CPC ............ *H04W 24/08* (2013.01); *H04L 43/10* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 7,069,558 B1* | 6/2006 | Stone | G06F 9/5016 718/100 |
| 2010/0054145 A1* | 3/2010 | Frenger | H04W 72/542 370/252 |
| 2010/0246507 A1 | 9/2010 | Dan | |
| 2015/0215841 A1* | 7/2015 | Hsu | H04W 12/12 370/328 |
| 2017/0041817 A1* | 2/2017 | Shomura | H04W 24/08 |

FOREIGN PATENT DOCUMENTS

CN  102333348 A  * 1/2012
JP  2010-233137 A  10/2010

* cited by examiner

*Primary Examiner* — The Hy Nguyen
(74) *Attorney, Agent, or Firm* — Volpe Koenig

(57) ABSTRACT

It is provided a communication system comprising: an access system including a base station wirelessly receives information from a terminal, and an edge apparatus; a user data system including a mobile core apparatus configured to receive via the edge apparatus a signal transmitted from the base station; and a monitoring system including a packet analysis apparatus analyzes traffic used by the terminal from the user data copied by the edge apparatus, a wireless quality calculation unit calculates a wireless quality between the base station and the terminal, and a visualization unit visualizes a usage situation of a wireless resource based on calculation using information collected from the packet analysis apparatus, the mobile core apparatus, and the wireless quality calculation module, the visualization unit outputs data for displaying the usage situation of the wireless resource from an arrangement of the terminal, the calculated wireless quality, and the analyzed traffic.

6 Claims, 15 Drawing Sheets

1frame = 10ms

TRAFFIC      $T = Psize \cdot Pr$
QUALITY      $C = S / ( N + \sum Ix )$
             $Ix = Sx \cdot [Tx/Cx]/\text{total RB}$
USED RESOURCE  $RB = T/C$ QUALITY C(s) = T/total RB

COMMUNICATION SYSTEM AND COMMUNICATION MANAGEMENT METHOD

CLAIM OF PRIORITY

The present application claims priority from Japanese patent application JP 2020-051057 filed on Mar. 23, 2020, the content of which is hereby incorporated by reference into this application.

BACKGROUND OF THE INVENTION

This invention relates to a method of managing communication in a communication system.

There are expectations for usage of mobile communication in a private network, for example, private long-term evolution (LTE) and local 5G. With the usage of private networks, it becomes easier for service recipients to build a network customized for their own applications, and the usage of private networks is expected to improve credibility and reliability, for example, by preventing information leakage outside the private network.

In an Internet of things (IoT) system, "things" such as sensors become sources of information, and machine-to-machine communication (M2M) is expected to increase. Further, in factories, wireless communication for collecting images from cameras is required. Continuous primary information from those sensors is aggregated in an edge apparatus arranged separately, and the aggregated information is used as secondary information.

JP 2010-233137 A relates to a background technology of this technical field. In JP 2010-233137 A, there is described a mobile communication system including: means for calculating a data communication speed based on a communication quality index measured by a terminal and transmitted to a base station in response to a start request to the base station from an application included in the terminal; means for statistically calculating traffic transmitted to the terminal; means for determining a statistical value of the number of available resource blocks; means for determining an expected continuous duration of the data communication speed determined by a data communication speed calculation unit from the statistical value of the available resource blocks determined by an available resource block conversion unit; and means for transmitting the data communication speed and the continuous duration to the terminal. In the mobile communication system, the terminal is configured to display the data communication speed and the continuous duration transmitted from a mobile communication apparatus on display means, and to control coupling of the application based on a result of selection made by a user.

Specifically, the mobile communication apparatus as described in JP 2010-233137 A is configured to notify the user of a communication quality state and a communication-maintained time, which change depending on the location of the terminal and the coupling timing. This example of the related-art technology is now briefly described with reference to FIG. 17 and FIG. 18.

In FIG. 17, there is illustrated a wireless communication system including wireless terminal apparatus (1-1, 1-2, and 1-3), a base station apparatus 10, and a mobile core apparatus 20 as a wireless communication configuration. The base station apparatus 10 is configured to transmit a signal, for example, video information, received from the mobile core apparatus 20 to the terminal apparatus (1-1, 1-2, and 1-3) by radio waves. The terminal apparatus 1 is configured to receive, at each position, a reference signal transmitted by the base station apparatus 10 to measure a quality of a radio propagation path, and to transmit the obtained quality information on the propagation path as feedback to the base station apparatus 10. Based on the quality information on the propagation path provided as feedback, the base station apparatus 10 recognizes the latest quality of the propagation path, and transmits the video information, for example, to the terminal apparatus 1 by using an encoding method suitable for the quality of the propagation path. When the encoding method changes, the amount of the consumed wireless resource changes even when the amount of traffic is the same. As used herein, the "resource amount" is a wireless resource expressed by multiplying a wireless frame (time direction) by a frequency band (frequency direction). A plurality of terminals are coupled to each other by sharing and using this limited resource.

The base station apparatus 10 manages the resource allocated to the plurality of terminals by dividing and scheduling the limited resource provided to each terminal apparatus. FIG. 18 is a diagram for illustrating a total wireless resource amount and the resource amount used by each terminal apparatus. Here, it is assumed that each terminal apparatus communicates by using the same traffic. However, the quality of the propagation path between each terminal apparatus and the base station apparatus differs for each terminal apparatus. The resource amount consumed by each terminal apparatus is determined in accordance with the transmission path and the traffic of each terminal, and each terminal apparatus consumes a different amount of the resource (110, 111, and 112). An unused portion 101 is the amount obtained by subtracting the used portion of each terminal apparatus from the total resource 100. In the mobile communication system described in JP 2010-233137 A, the usage state is aggregated for each hour, the future is predicted from the past usage situation, and information for determining whether or not the user can communicate stably during communication is provided.

For reference, there is now described a case in which wired coupling is performed. In FIG. 19, in the case of wired coupling, three terminals are coupled, and each terminal apparatus communicates by using the same traffic. In this case, the line quality is the same for each terminal apparatus, and is almost unaffected by the transmission distance. When each terminal apparatus processes the same traffic, each terminal apparatus consumes the same amount of resource (120, 121, and 122). Further, when the total resource 102 is 1 gigabit/second Ethernet, the resource amount and a traffic amount may be considered to be match. Therefore, it is generally easy to calculate the unused resource 103, and the unused resource 103 can be calculated by subtracting the total of the traffic used by each terminal apparatus from the capacity of the line. Meanwhile, in the case of wireless communication, as illustrated in FIG. 18, even when the traffic on the line is the same, the resource amount required for wireless differs for each terminal apparatus (in FIGS. 18, 110, 111, and 112). The factors causing this difference to occur are as follows, for example. As illustrated in FIG. 20, when the power of the radio waves attenuates due to the distance between the base station apparatus 10 and the terminal apparatus 1, a terminal apparatus which is distant consumes a large amount of the wireless resource. Further, as illustrated in FIG. 21, when an obstruction enters the line of sight between the base station apparatus 10 and the terminal apparatus 1 and the radio waves directly arriving at the terminal apparatus 1 are blocked, the power of the radio waves arriving at the receiving side attenuates. In this case, a terminal apparatus having a low reception power consumes a large amount of the wireless resource.

Another factor is that, for example, radio waves transmitted by another base station apparatus or radio waves emitted by a terminal apparatus coupled to the base station apparatus affect communication and cause interference, which causes a temporary deterioration of the radio waves. In this way, in wireless communication, the quality of the communication path greatly depends on the environment, and the quality of radio waves is not fixed. Consequently, it is difficult to ensure stability. Therefore, it is an object of the invention described in JP 2010-233137 A to determine whether or not it is possible for a user to use a base station apparatus by providing a special mechanism for aggregating.

SUMMARY OF THE INVENTION

As described above, when wireless communication is used for IoT applications in factories, for example, except for specific mobile transportation equipment or the like, most terminals are video equipment, for example, a camera, or sensors for measuring temperature, an environment, and the like, and the positions of those terminals do not change. Therefore, the surrounding environment is considered to be more fixed and easier to predict and it is thus easier to improve communication efficiency than in the case assumed in JP 2010-233137 A. Meanwhile, it is inconvenient for the base station apparatus to measure and determine the situation of the resource after the terminal apparatus is installed. From the viewpoint of a factory manager, it is desired to investigate in advance the effects of installing the terminal at a desired position and to consider countermeasures before installation.

On the other hand, by more accurately grasping the quality of the propagation path after the terminal apparatus has been installed and accurately grasping the remaining amount of the resource, it is possible to accurately perform the determination of whether to add more terminals. However, in recent years, the market for manufacturing base station apparatus has become increasingly oligopolistic, and there are now only a few vendors manufacturing base station apparatus in the world. As a result, it is becoming more difficult to freely customize the configuration and functions of the base station apparatus. Therefore, in place of the method of building the functions inside the base station apparatus as disclosed in JP 2010-233137 A, a method of grasping the resource situation by alternative means which combines the functions of the apparatus around the base station apparatus is now required.

Further, in JP 2010-233137 A, communication is mainly a downlink, specifically, from a base station apparatus to a terminal apparatus, but in IoT applications in factories, for example, there is a difference in that communication is mainly an uplink, specifically, from a terminal apparatus to a base station apparatus. For example, in a communication method, for example, LTE, the downlink is orthogonal frequency-division multiple access (OFDMA) and an allocated resource is distributed and arranged in a frequency domain. Therefore, the interference from one communication on adjacent cells is partial, and the partial deterioration in quality is averaged over the entire used resource by employing a technology, for example, interleaving or transmission line coding. For that reason, it is possible to determine the resource situation by statistical calculation. However, the uplink is composed of single-carrier frequency-division multiple access (SC-FDMA), and one communication is collectively allocated to consecutive subcarriers based on frequency division. Therefore, the interference on adjacent cells becomes a collision between consecutive subcarriers, and is greatly affected by whether the same frequency channel is allocated to adjacent cells. The collision affects not just a partial frequency channel but the entire frequency channel, and therefore the effect of averaging the effect of the interference over the entire frequency band is extremely low even when interleaving or transmission line coding is employed. As a result, the effect of channel collision becomes a serious problem.

FIG. 22 is a diagram for illustrating a flow of data in an uplink. The terminal apparatus 1 includes an information source, for example, a camera 2, and a modem 3 for transmitting information to a center. The camera 2 is configured to transmit information to the modem 3 by a communication method, for example, user datagram protocol (UDP). The modem 3 accumulates the received information in a buffer 4. Further, the modem 3 requests from the base station apparatus 10 a wireless resource for transmission when data is accumulated in the buffer 4. The base station apparatus 10 allocates an appropriate wireless resource in accordance with the request from the terminal apparatus 1. The modem uses the allocated resources to transmit information to the base station apparatus 10. However, when an obstruction 500, for example, enters between the terminal apparatus 1 and the base station apparatus 10, the line quality deteriorates, and it is not possible to transmit the same amount of data unless a larger amount of the wireless resource is used. As a result, in some cases, data that cannot be transmitted even when all the resource is used flows into the buffer, and the amount of data stored in the buffer increases over time. Eventually, when the maximum buffer amount is reached, it is not possible to store additional inflow data in the buffer. In UDP, data integrity by performing retransmission, for example, is not guaranteed, and therefore data is discarded during data transmission from the camera to the cloud, and the user feels that the line quality has deteriorated significantly.

Specifically, in the related art, the propagation path is estimated based on the data measured in the base station apparatus. Therefore, in the case of an uninstalled terminal apparatus which has not yet performed communication or an existing terminal which has moved to a new location, there is no way to know the quality of radio waves in advance, and it is not possible to use the related-art method. Until a new terminal apparatus is installed, for example, when a new terminal apparatus is added to an existing environment, for example, a factory, the state after installation is unknown, and whether or not stable operation can be performed can only be determined after the installation. Existing technologies, for example, a propagation simulator, are known, but those existing technologies are technical means for calculating a propagation loss. There are no technical means for solving the problem described above after calculating the propagation loss in consideration of the impact of the propagation loss.

Further, in recent years, the market for manufacturing base station apparatus has become increasingly oligopolistic, and there are now only a few vendors manufacturing base station apparatus in the world. Therefore, it is difficult to add a function for measuring wireless quality to a base station having a common design. A stationary terminal apparatus which does not move is required to have a mechanism for measuring the quality of radio waves in an appropriate time band and indirectly measuring the quality of radio waves based on observations at peripheral devices other than the base station apparatus.

Moreover, when a plurality of base station apparatus are installed in the same factory to increase the communication capacity, the signals transmitted by the terminal apparatus coupled to each base station apparatus interfere with the base stations other than the base station to which the terminal apparatus is communicating. At this time, communication is performed in the uplink by SC-FDMA, and therefore the frequencies are continuously allocated. As a result, the presence or absence of interference significantly affects the quality. There has not been a method of properly distributing the wireless resource because there has not been a method of determining the distribution of the wireless resource amount based on traffic or quality.

The representative one of inventions disclosed in this application is outlined as follows. There is provided a communication system, which is configured to collect information from a plurality of terminal apparatus, the communication system comprising: an access system including a base station apparatus configured to wirelessly receive information from the plurality of the terminal apparatus, and an edge apparatus configured to copy at least a portion of user data from a signal received by the base station apparatus; a user data system including a mobile core apparatus configured to receive via the edge apparatus a signal transmitted from the base station apparatus; and a monitoring system including a packet analysis apparatus configured to analyze traffic used by each of the plurality of the terminal apparatus from the user data copied by the edge apparatus, a wireless quality calculation unit configured to calculate a wireless quality between the base station apparatus and each of the plurality of the terminal apparatus, and a visualization unit configured to visualize a usage situation of a wireless resource based on calculation using information collected from the packet analysis apparatus, the mobile core apparatus, and the wireless quality calculation module, the visualization unit being configured to output data for displaying the usage situation of the wireless resource from an arrangement of the plurality of the terminal apparatus, the calculated wireless quality, and the analyzed traffic.

According to at least one aspect of this invention, an on-site communication manager can grasp whether or not stable wireless communication is possible by observing peripheral devices other than the base station apparatus. Problems, configurations, and effects other than those described above are clarified by the following description of embodiments of this invention.

DETAILED DESCRIPTION OF THE PREFERRED EMBODIMENTS

First Embodiment

A first embodiment of this invention is now described.

Figure 1:
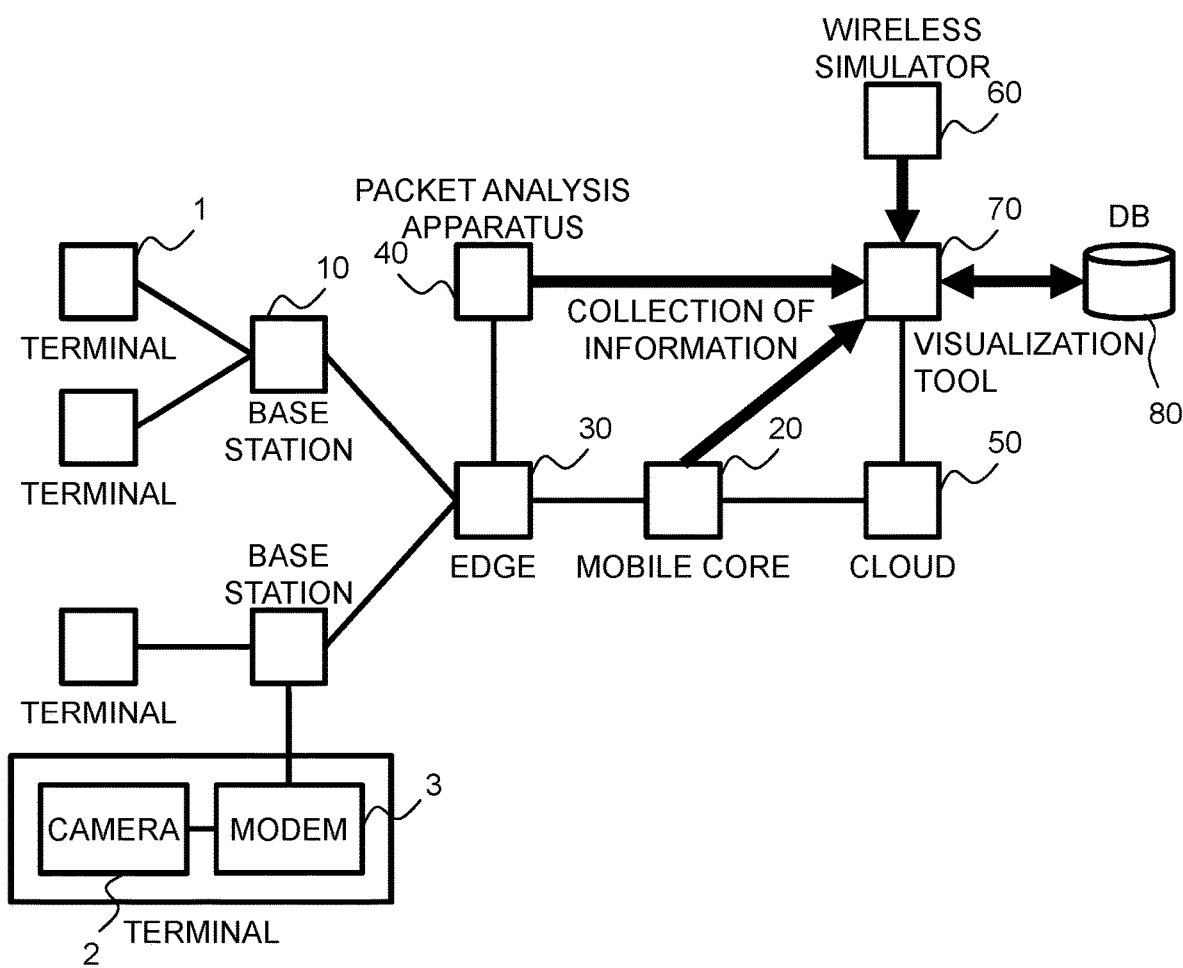
FIG. 1 is a diagram for illustrating a configuration of a communication system according to a first embodiment of this invention.

FIG. 1 is a diagram for illustrating a configuration of a communication system according to a first embodiment of this invention. In FIG. 1, a terminal apparatus 1 includes an information source, for example, a camera 2, and a modem 3 configured to wirelessly transmit information. The information source mounted on the terminal apparatus 1 may be a sensor. The terminal apparatus 1 is configured to transfer information converted into a wireless signal to a base station apparatus 10. The base station apparatus 10 is configured to convert the wireless signal into a wired electric signal, and to transfer the converted electric signal to a mobile core apparatus 20 via an edge apparatus 30. The edge apparatus 30 is configured to extract user data information by mirroring, and to transmit the extracted user data information to a packet analysis apparatus 40. The mobile core apparatus 20 is configured to convert user data into IP packets, manage a position of the terminal apparatus 1, and to follow a terminal apparatus 1 which has been moved to be under the control of another base station by handover such that communication is continued.

The IP packets created by the mobile core apparatus 20 are transmitted to a cloud 50 in accordance with a destination address of the packets, and a higher-level application performs arithmetic processing to provide a service. The cloud 50 is built from a computer configured to provide a service by a higher-level application. Meanwhile, the amount and the jitter of the user data mirrored by the edge apparatus 30 are analyzed by the packet analysis apparatus 40, and results of the analysis are transmitted to a visualization tool 70. Further, the mobile core apparatus 20 also collects performance-related statistical values from the base station apparatus 10 and transmits the collected information to the visualization tool 70.

A wireless simulator 60 is a so-called propagation simulator, in which an installation state and surrounding environment of the base station apparatus 10 and the terminal apparatus 1 are registered as a three-dimensional model. The wireless simulator 60 is configured to reproduce the propagation of the radio waves by simulation, and to calculate a propagation loss between the terminal apparatus 1 and the base station apparatus 10. All of the information obtained from the packet analysis apparatus 40, the mobile core apparatus 20, and the wireless simulator 60 is stored in a database 80.

The user receives two functions by using the visualization tool 70. The first function is presentation of the current usage situation of the wireless resource. The second function is presentation of a prediction result of a future usage situation of the wireless resource.

The current usage situation of the resource is generated from an analysis result of a performance statistical value from the mobile core apparatus 20 and an analysis result of a traffic amount flowing wirelessly from the packet analysis apparatus 40. Wireless quality between each terminal apparatus 1 and the base station apparatus 10 is not grasped from the information obtained from the packet analysis apparatus 40, and therefore the wireless quality is calculated based on calculation which gives consideration to the characteristics of the wireless method by using the propagation loss calculated by the wireless simulator 60.

For the future usage situation of the resource, in addition to the information described above, for example, the future position of the terminal apparatus 1 and the position of an obstruction are estimated, and the wireless simulator 60 calculates the wireless quality by calculating the future propagation loss in consideration of the characteristics of the wireless method.

Figure 2:
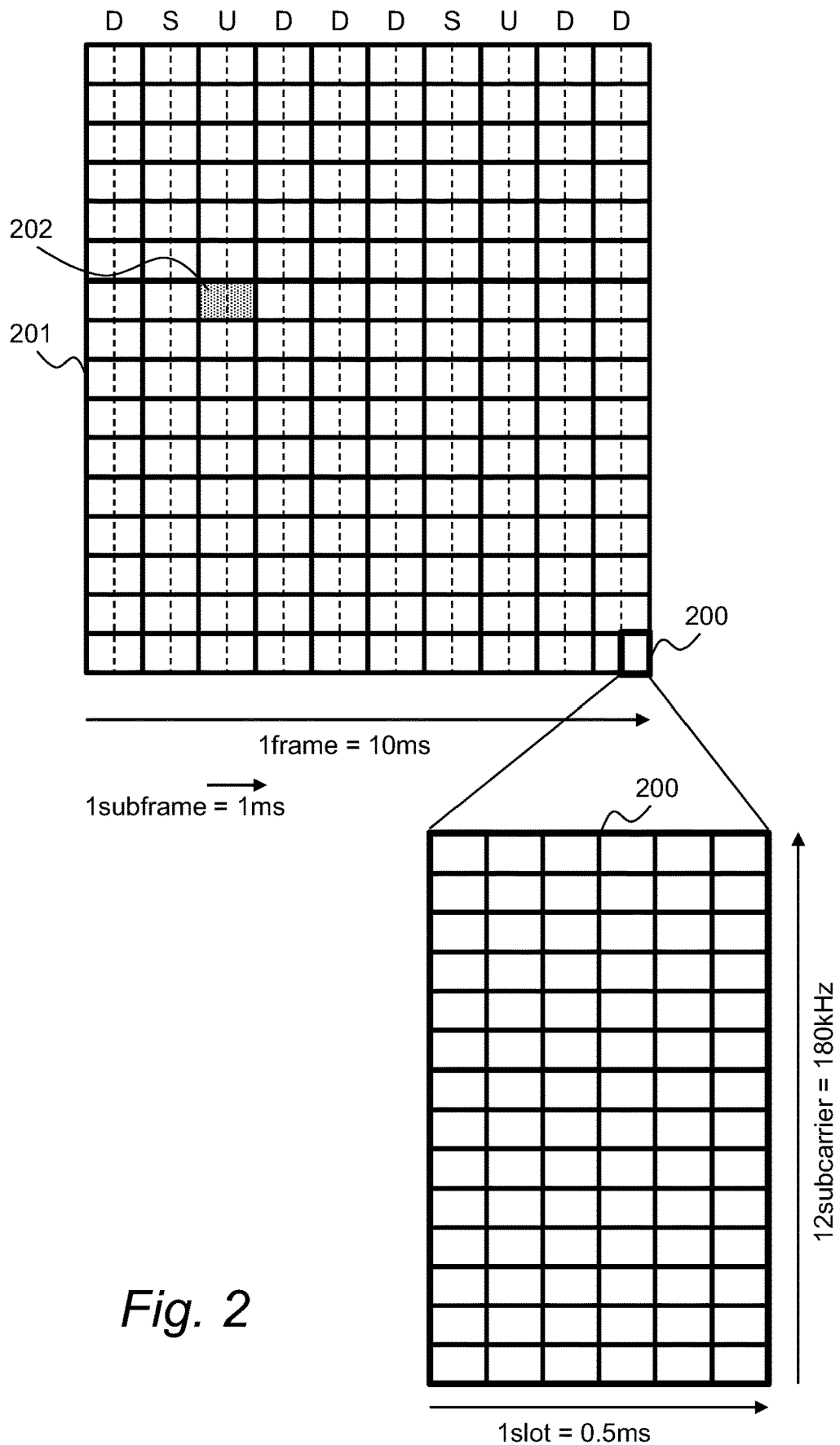
FIG. 2 is a diagram for illustrating a wireless resource (LTE frame structure) in the first embodiment.
Figure 3:
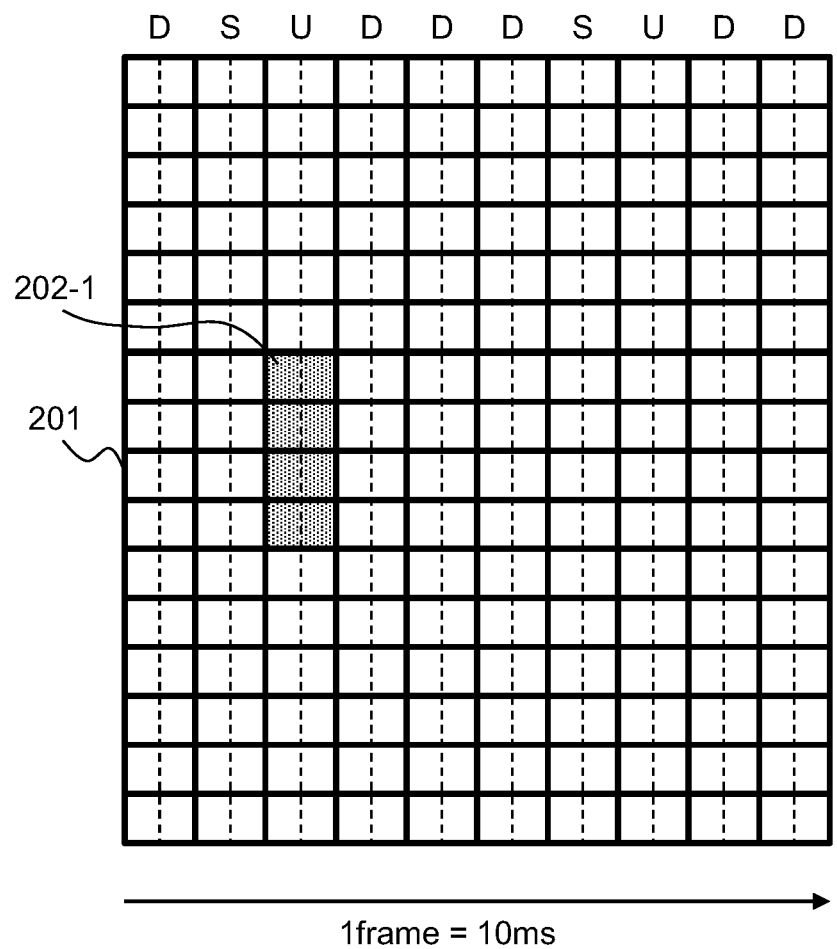
FIG. 3 is a diagram for illustrating an allocation example of the wireless resource in the first embodiment.

Next, the processing of indicating the current usage situation of the wireless resource is described. The information on the current usage situation of the wireless resource may be, for example, information on a usage rate of a resource block as a statistical value collected by the mobile core apparatus 20. The current usage situation is usually indicated as an average value of a relatively long span, for example, 15 minutes. In order to understand this background, in FIG. 2, there is illustrated an LTE frame structure defined by 3GPP, which is a standardization organization. In the upper diagram of FIG. 2, a TD-LTE frame 201 is illustrated, with time on the horizontal axis and frequency on the vertical axis. The letters D, S, and U at the top of the diagram refer to a downlink subframe for transmitting a signal from the terminal to the base station, a special subframe including the time width required for switching between uplink and downlink, and an uplink subframe for transmitting a signal from the terminal to the base station, respectively. A resource block 200 has a basic configuration of 0.5 millisecond, which is one slot, by 180 kilohertz, which is 12 subcarriers. Two resource blocks 202 are allocated as one unit. For example, in FIG. 3, there is illustrated a state in which 8 uplink resource blocks 202-1 are allocated, and the usage rate of the resource blocks is 4/64=6.25%. Similarly, in FIG. 4, there is illustrated a state in which 56 resource blocks are allocated among the 64 uplink resource blocks, and the usage rate of the resource blocks is 56/64=87.5%.

In general, when packets are transferred on a wireless line, the terminal apparatus 1 being a transmission source requests a communication modem to transmit the packets, and the packets are accumulated in a buffer. When data has accumulated in the buffer, the communication modem requests the base station apparatus 10 to allocate the wireless resource. The base station apparatus 10 receives the allocation request from the terminal, and a scheduler of the base station apparatus 10 appropriately allocates a resource block. As a result, immediately after the resource is requested from the terminal apparatus 1, the usage rate of the wireless resource temporarily becomes close to 100%. Even when data is continuously generated in the terminal apparatus 1, the wireless resource request from the communication modem of the terminal apparatus 1 stops when the buffer becomes empty. When there is no data to transmit, the resource block is not used and is available.

To summarize, there are times when the resource is fully used and times when the resource is available. The usage rate, which is a statistical amount, of the resource block does not indicate the temporary resource block usage rate, and the usage rate is information indicating whether there is, on average, availability in terms of time. Attention is required to be given to changes in the user experience due to resource consumption occurring in bursts (units of several seconds in a row) or in a scattered manner over time. When the resource usage rate is 100% in a burst, it can be considered that the traffic is not being processed properly within the burst, causing buffer accumulation to increase and a delay to occur. Meanwhile, when availability is distributed over time, there is an available resource at any time, and data transmission is scheduled in the available space, and hence a large delay does not occur.

In order to determine such a difference, it is required to collect information by measuring the traffic amount transferred wirelessly and the jitter in detailed time intervals. In the first embodiment, the packet analysis apparatus 40 plays that role. The packet analysis apparatus 40 is configured to measure the amount of traffic flowing wirelessly and the jitter for each terminal apparatus 1, and to aggregate the measured traffic amount and jitter in units of, for example, seconds or minutes. When wireless resource usage occurs in a temporarily concentrated burst, the average traffic of the terminal apparatus 1 decreases overall during that time period. In addition, jitter occurs in periodically transmitted information, and hence it is possible to detect a situation in which the wireless resource is temporarily insufficient due to a burst-like traffic concentration. When it can be detected that the resource is scarce, it is possible to warn the administrator that adding traffic to the same time band has a high risk in terms of stability.

Further, through working together with the wireless simulator 60, the wireless resource amount required on average by each terminal apparatus 1 can be estimated. A three-dimensional model relating to the position information and environment of the terminal apparatus 1 and the base station apparatus 10 is input to the wireless simulator 60. The wireless simulator 60 can reproduce by calculation the propagation of the radio wave between the terminal apparatus 1 and the base station apparatus 10 to determine the propagation loss. Reception performance of each base station apparatus 10 is affected by noise power generated by the base station apparatus 10 itself and interference power generated by the surrounding terminal apparatus 1. The noise power generated by each base station apparatus 10 can be obtained from a performance table of the apparatus. Further, the terminal apparatus 1 which is the dominant cause of the interference power is, of the terminal apparatus 1 coupled to the adjacent base station apparatus 10, a terminal apparatus 1 which is transmitting at large power because the propagation loss with the coupled base station apparatus 10 is large, and which does not have a large propagation loss with the station apparatus 10 and is easily affected by propagation. This interfering terminal can be selected based on the propagation loss calculated by the wireless simulator 60. Moreover, the traffic amount transmitted by the terminal apparatus 1 is grasped by the packet analysis apparatus 40 described above. Therefore, the estimated value of the interference power generated by the terminal can be calculated as an approximate value based on, for example, the calculation shown in FIG. 5.

Figures 4, 5:
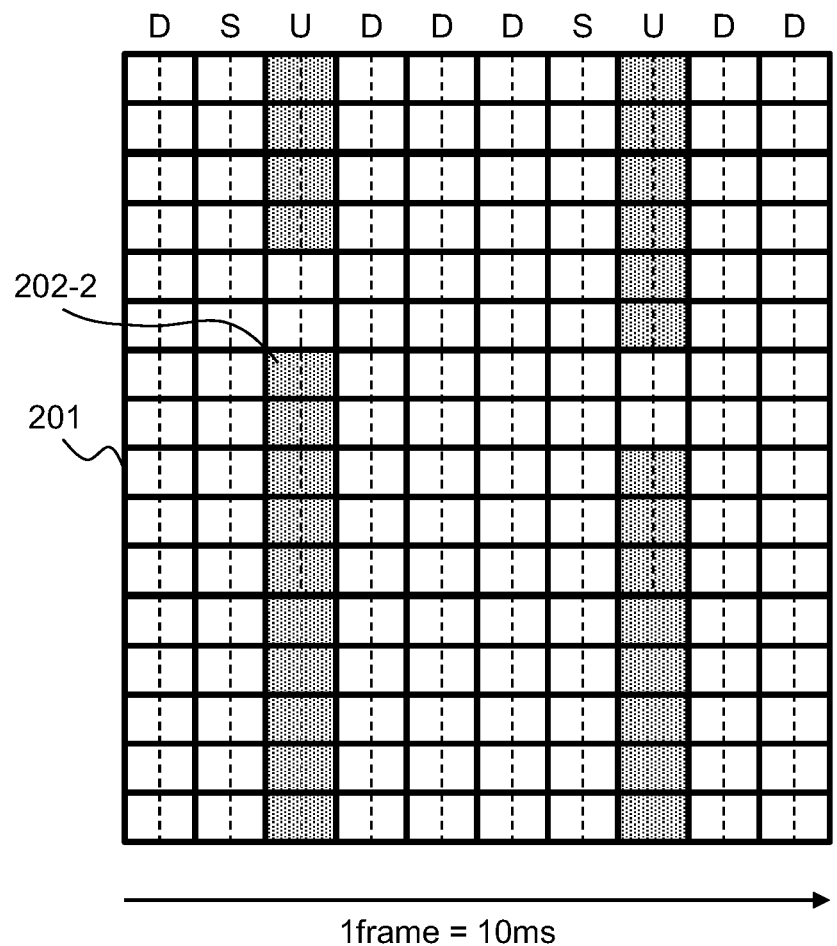
FIG. 4 is a diagram for illustrating an allocation example of the wireless resource in the first embodiment.
FIG. 5 is a diagram for showing a relational expression among traffic, quality of a propagation path, and a used resource amount in the first embodiment.

The expression shown in FIG. 5 is now described. The visualization tool 70 is configured to calculate the traffic as a product T of a packet size Psize and a probability Pr representing the occurrence frequency of the packet size Psize. A quality C can be calculated based on a signal-to-noise power ratio SINR. In the expression of the quality C, S can be calculated from the propagation loss and a maximum output of the terminal. Symbol N represents the noise power of the base station and can be obtained from the performance table of the apparatus. Symbol Ix represents the interference power from the terminal which is the interference source selected earlier, and the sum of Ix is aggregated. In order to determine the level of interference generated by the terminal that is the interference source, the used resource is calculated by Tx/Cx. As described above, Tx represents the traffic of the terminal, and can be grasped from the measurement described above. Further, a can be calculated from a transmission power Sx to the base station to which the terminal is coupled and the noise and interference power. The resource used by the terminal is known from this calculation, and therefore the ratio of the used resource can be found by dividing by a total resource number totalRB. Further, when the propagation loss from the interfering terminal is known, the transmission power Sx to the base station which is being interfered with can be known, and therefore the interference power Ix as an average value can be calculated. In the calculation of Cx, it is required to calculate the interference power from the terminals coupled to the peripheral base station, which means that the calculation is a cyclic calculation. Therefore, it is required to pay attention to the fact that the calculation is required to be performed for several iterations. As a result of the series of calculations, the resource number required by each terminal can be calculated as RB. This gives the current usage situation of the wireless resource and the estimated usage situation of each terminal.

The visualization tool 70 can visualize the usage situation of the resource obtained in this way and the usage situation of each terminal and present the visualized usage situations to the user. The user can grasp the situation of the terminal with a particularly high usage rate (high traffic or poor wireless quality). At this time, the situation is visualized by external monitoring or simulation-based support without introducing a special program to the base station apparatus 10, and therefore the current situation can be shown by eliminating dependency on the vendor of the base station apparatus 10. As a result, a problem of this invention can be solved. Specifically, it is not required to change the specification of the base station apparatus 10 provided by the vendor which provides the wireless system globally.

Next, processing of indicating a future usage situation of the wireless resource is described. The future usage situation is required to be predicted because there is no actual data. In the wireless simulator 60, the position information of each terminal and the base station and three-dimensional data about the environment are input. The base station apparatus 10 to which the terminal is coupled and the propagation loss at the time of coupling to the base station apparatus 10 can be calculated from changes in the position of the terminal and information on a position at which the terminal is to be newly installed. A ray tracing method, for example, can be employed for the calculation method. However, the calculation method does not relate to the essence of this invention and the embodiments, and therefore description of the calculation method is omitted here. After the propagation loss is calculated, traffic which is similar in type to the terminal is acquired by referring to the database 80. For example, in the case of a terminal which photographs images by using the camera 2, the traffic of a similar existing terminal having a camera is used as a model. The wireless simulator 60 calculates the propagation loss due to the terminal position, and therefore an estimated value of the interference power can be calculated by the calculation method shown in FIG. 5. Further, the required resource and the effect on the terminals coupled to another base station apparatus 10 can be calculated. As a result, the usage situation of the resource can be considered before the terminal is actually arranged. Based on the configuration of the first embodiment, the usage situation of the resource can be grasped, and for example, the impact of installing a new terminal on current communication (for example, whether stable communication is affected) can be determined in advance. As a result, a problem of this invention can be solved.

Figure 6:
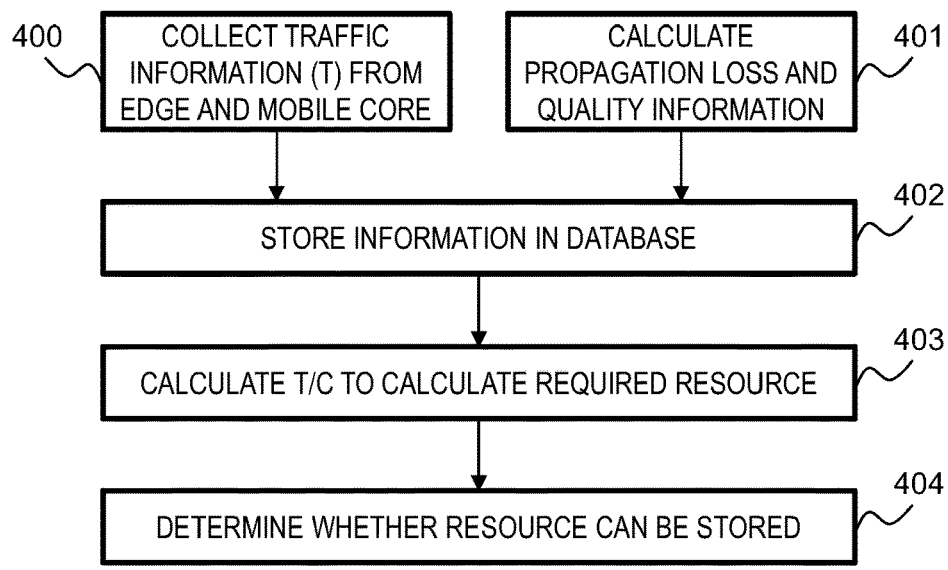
FIG. 6 is a flowchart for illustrating processing of predicting a future usage situation of the wireless resource in the first embodiment.

The processing of predicting the future usage situation of the wireless resource is now described with reference to FIG. 6. First, traffic information is acquired from the edge apparatus 30 and the mobile core apparatus 20 (Step 400). Further, the wireless simulator 60 calculates the propagation loss and the quality information (Step 401). The database 80 stores the calculated propagation loss and quality information (Step 402). The traffic is estimated based on a similarity with a terminal to be newly added by using the traffic information acquired in Step 400 (for example, a traffic model), or in the case of a moving terminal, the traffic is estimated by using the past traffic. Based on the estimated traffic, TIC is calculated and the required resource is calculated (Step 403). Then, the calculated resource is added to the currently used resource to determine whether or not the resource is sufficient, and the determination result is presented to the user (Step 404). Through this processing, the user can predict in advance the state of the resource to be used, and can determine whether or not a terminal can be added.

Figure 7:
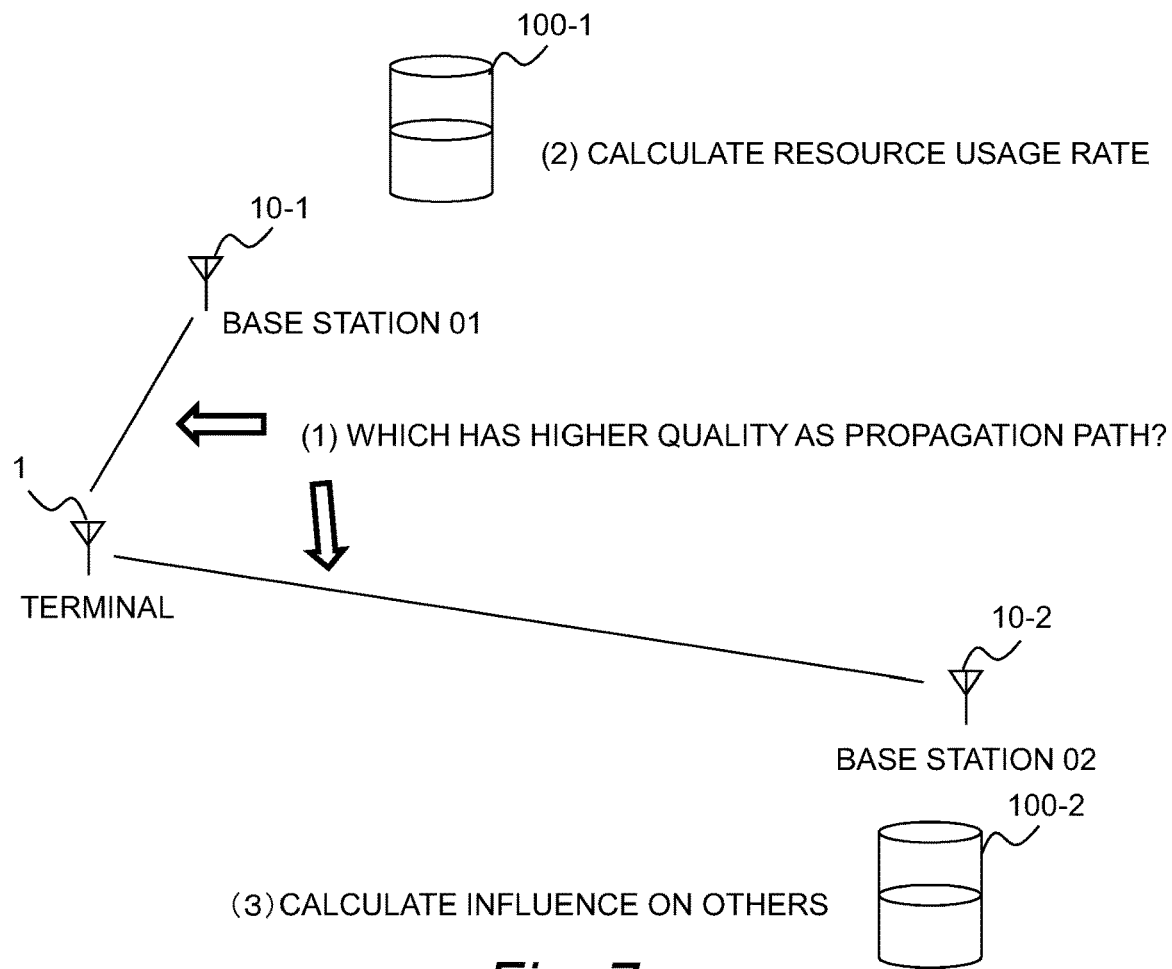
FIG. 7 is a diagram for illustrating an outline of a calculation procedure of a wireless simulator in the first embodiment.

An outline of the calculation procedure of the wireless simulator 60 is now described with reference to FIG. 7. FIG. 7 is a diagram for illustrating an environment in which a terminal apparatus 1 and two base station apparatus (10-1 and 10-2) are installed. The terminal is coupled to any one of the two base station apparatus 10-1 and 10-2 for communication. In usage cases, for example, a factory IoT, the terminal apparatus 1 hardly moves and is stationary. Therefore, the terminal is stably coupled to one base station apparatus 10. There have been discussions about a highly stable solution in which a large number of base station apparatus 10 are arranged and the lines are multiplexed, but in general, the cost of the base station apparatus 10 is high and when the received signal is not synthesized as a wireless signal before demodulation, there is not expected to be an improvement in the error correction code, and hence the return on investment in paired throughput is low. Therefore, in the first embodiment, such a case is not considered. The base station apparatus 10 to which the terminal apparatus 1 is coupled can be determined from the calculation of the propagation loss by the wireless simulator 60. The terminal apparatus 1 is coupled to the base station apparatus 10 having a large reception power of a reference signal, and therefore in the case of FIG. 7, the propagation loss is calculated by the wireless simulator 60 for the two base station apparatus 10-1 and 10-2. The base station apparatus 10 having the smaller loss is then selected as the coupling destination. Here, for the sake of simplicity, there is described a case in which it is assumed that the transmission power of the base station apparatus 10 is the same, but when there is a difference in the power transmitted by the base station apparatus 10, it may be required to consider correction for that amount.

Next, the resource used by the terminal apparatus 1 is calculated by the base station apparatus 10 being a coupling destination. The details can be calculated as RB by the calculation method shown in FIG. 5. Then, the impact on the other base station apparatus is calculated. The impact can also be calculated as Ix by the calculation method shown in FIG. 5.

Figure 8:
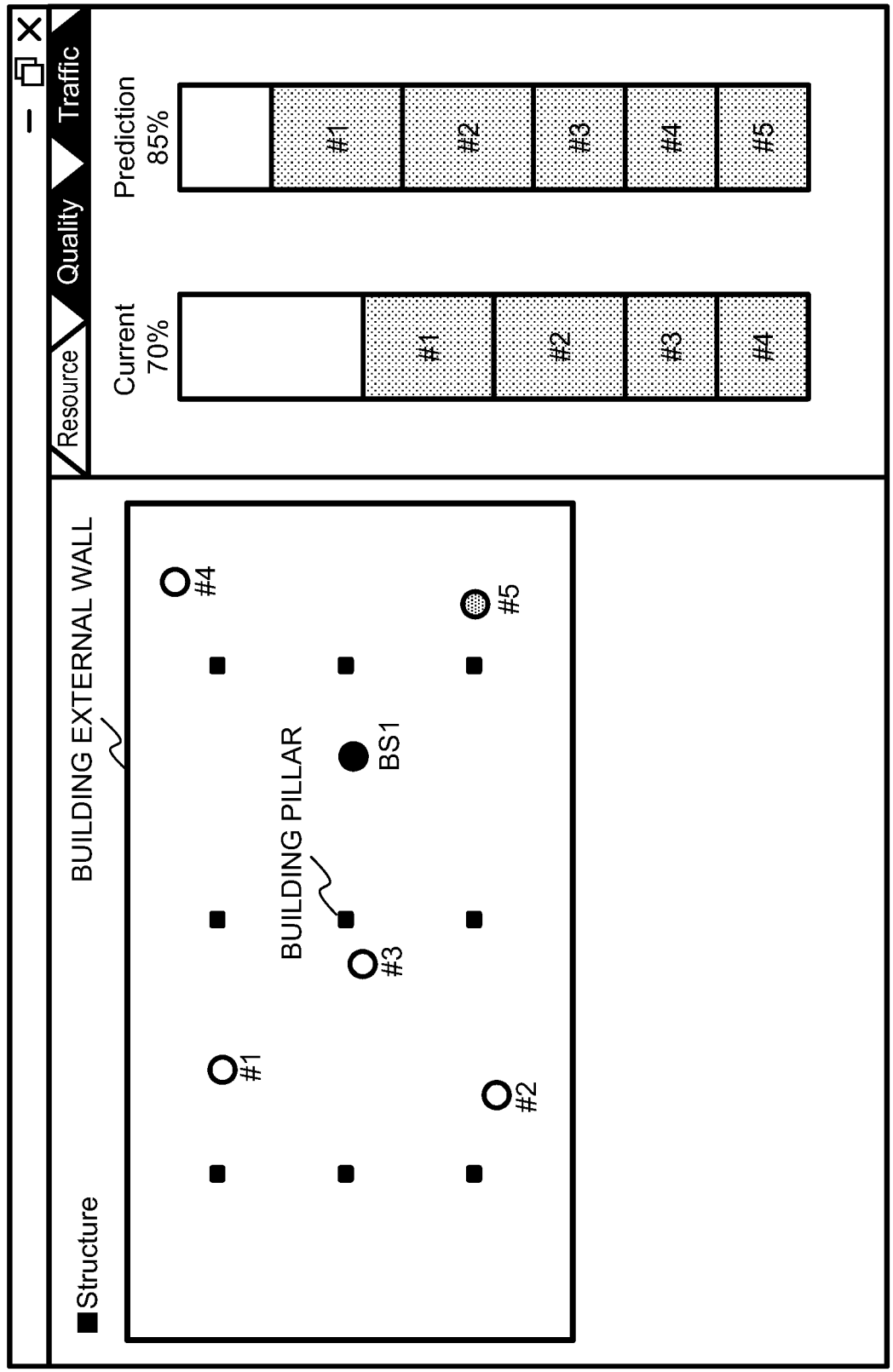
FIG. 8 is a diagram for illustrating an example of an information screen in the first embodiment.
Figure 9:
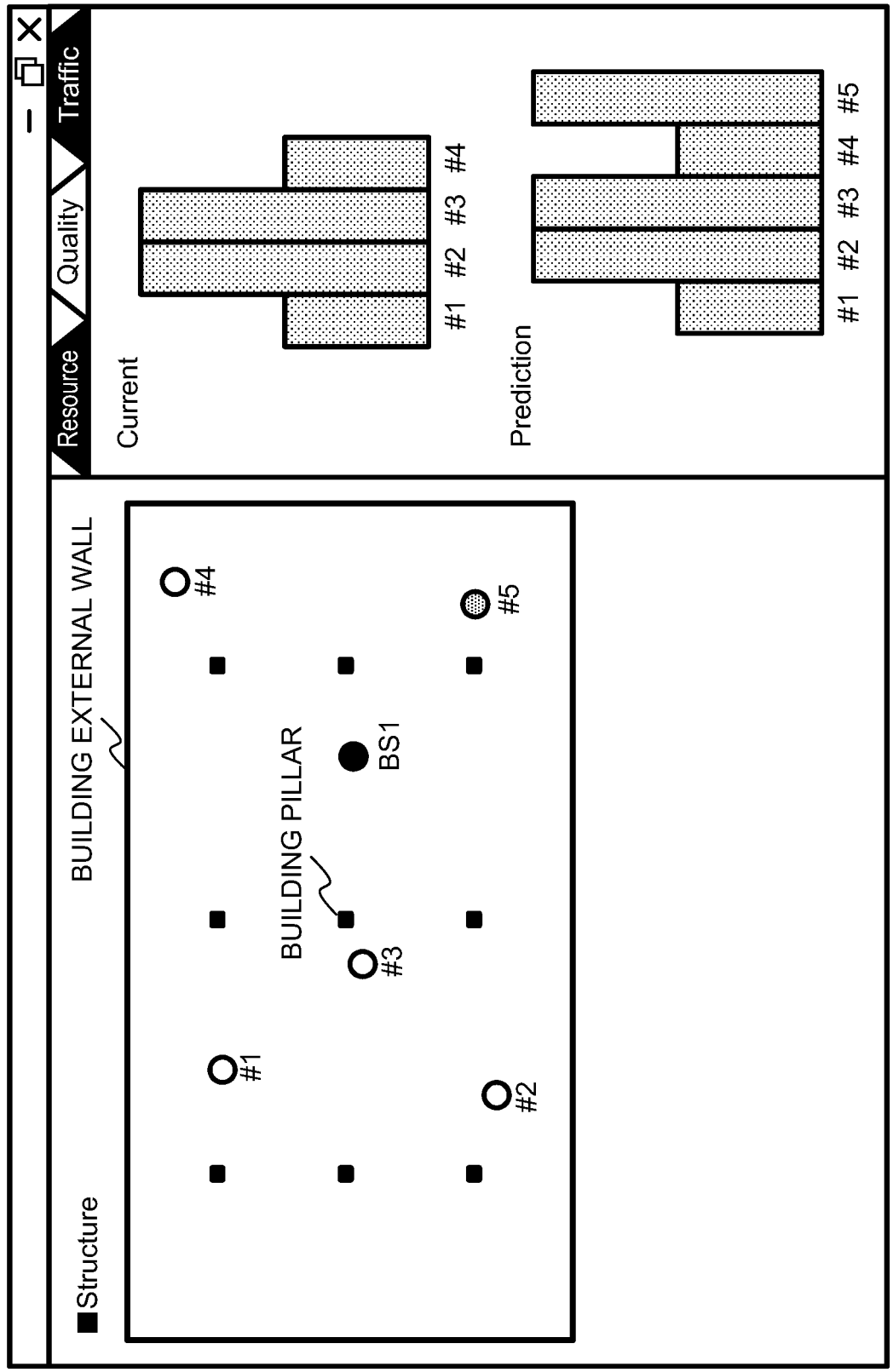
FIG. 9 is a diagram for illustrating an example of the information screen in the first embodiment.
Figure 10:
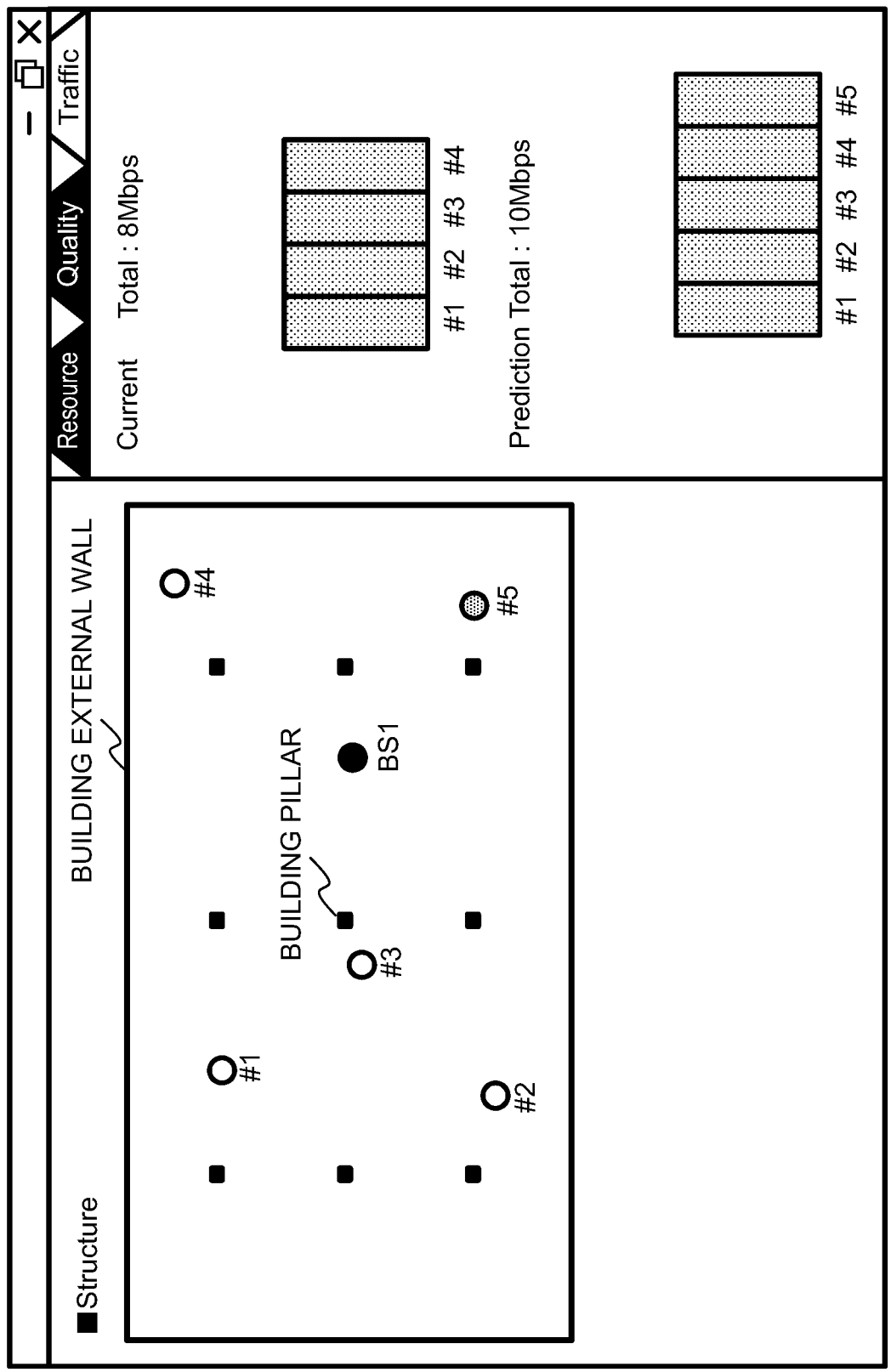
FIG. 10 is a diagram for illustrating an example of the information screen in the first embodiment.

FIG. 8, FIG. 9, and FIG. 10 are diagrams for illustrating examples of the information screen in the first embodiment. In each diagram, the area described as "Structure" on the left side shows the arrangement situation of the base station apparatus 10 and the terminal apparatus 1, and information on the external walls of the building, separate rooms, and the pillars of the building, for example, is displayed. A wireless simulation is performed based on this data. In this example, a base station BS1, stationary terminal apparatus #1 to #5, and moving terminal apparatus #101 to #102 are displayed. The area on the right side of the screen shows the resource situation. Three types of information, that is, the resource situation, the wireless quality situation, and the traffic situation, can be selected and viewed by selecting a tag at the top. In FIG. 8, there is illustrated a screen in which the resource is selected, and in FIG. 9, there is illustrated a screen in which the wireless quality is selected. In FIG. 10, there is illustrated a screen in which the traffic situation is selected, and information on the selected situation is displayed.

On the screen illustrated in FIG. 8, the wireless resource usage situation is shown. As displayed in the "Structure" area, five terminals (#1 to #5) are arranged in this environment. Of those, the terminal #5 is a possible terminal which has not actually been installed yet. The total resource usage rate of the four terminals #1 to #4 currently in operation is 70%, and it is displayed that there is still a certain level of the resource remaining. Based on the prediction value (Prediction), even when the terminal #5 is added, the resource usage rate is 85%, and it is possible to know in advance that there is a high possibility that stable operation is possible even after the terminal #5 is installed.

On the screen illustrated in FIG. 9, the wireless quality situation, which is the basis of the resource calculation, is displayed. Specifically, it is displayed that the terminals #1 and #4 have poor wireless quality. The displayed wireless quality is a depiction of the calculation result of the wireless simulator 60. Looking at the prediction value ("Prediction") in the lower part of the right area, there is displayed a prediction that the quality of the terminal #5 to be newly added is good.

On the screen illustrated in FIG. 10, information on the traffic of each terminal, which is the basis of resource calculation, is displayed. The display can be implemented by acquiring the traffic information on a terminal similar to the terminal #5 from the database 80 in which the traffic information collected from the packet analysis apparatus 40 or the mobile core apparatus 20 is accumulated. The user can know from the screen illustrated in FIG. 8 the current resource usage rate and the resource usage rate when a terminal is newly added, and can determine in advance whether or not a stable communication environment can be obtained after the addition of the terminal #5. Therefore, a problem of this invention can be solved.

Figure 11A:
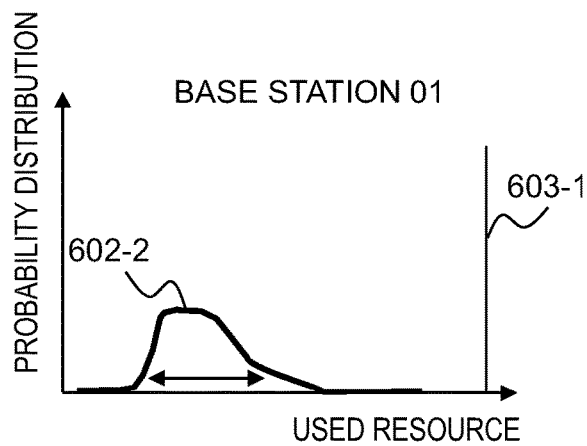
FIG. 11A, FIG. 11B, and FIG. 11C are diagrams for illustrating use of the resource at the same frequency by a plurality of base station apparatus in the first embodiment.
Figure 11B:
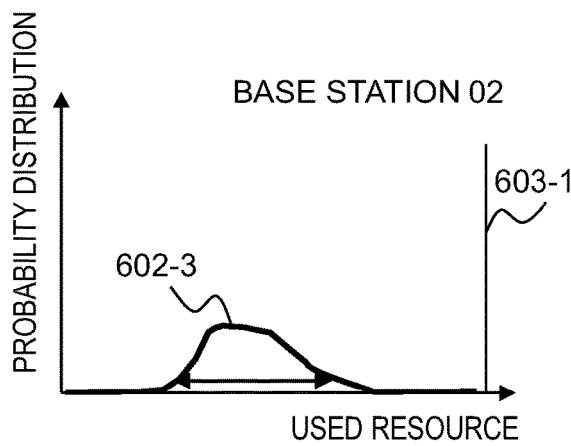
Figure 11C:
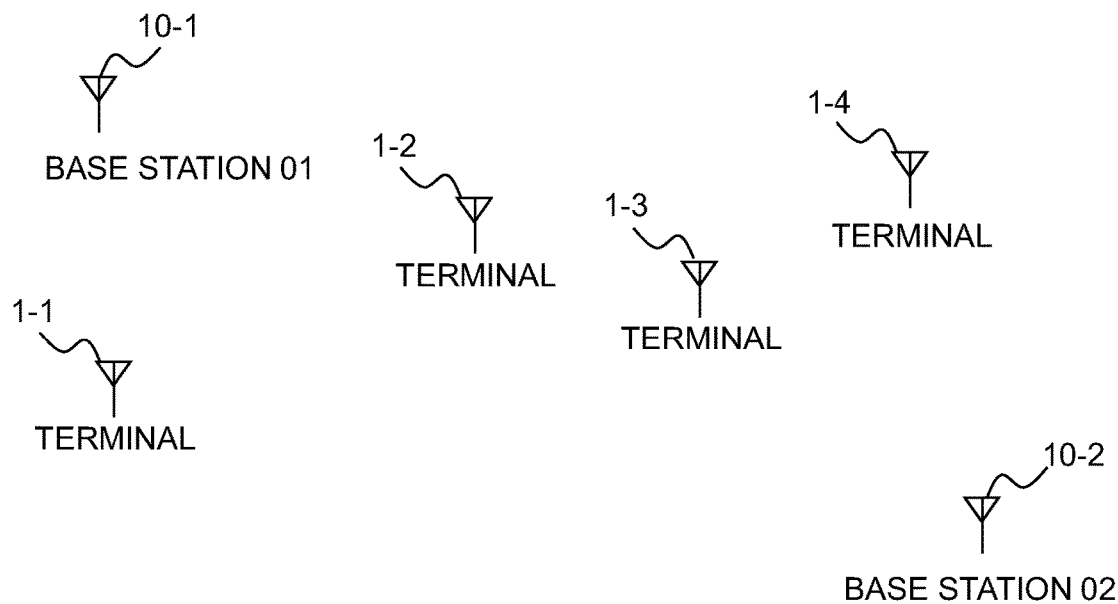

The use of the resource when a plurality of base station apparatus 10 use the same frequency is now described with reference to FIG. 11A to FIG. 11C. For the communication method, for example, LTE, SC-FDM is used for the uplink, and continuous frequencies are allocated in the real frequency domain. Therefore, interference occurs at a specific frequency, and there is an increase in the difference in quality between the frequency at which interference occurs and the frequency at which interference does not occur. In this case, even for a terminal apparatus 1 which does not move its location, the wireless quality is different between cases in which the frequency at which interference from a terminal apparatus 1 coupled to an adjacent base station apparatus 10 is allocated and cases in which the frequency at which there is no interference or a small interference is allocated. As a result, when the frequency at which interference occurs is allocated, retransmission occurs and the required wireless resource fluctuates. This state is illustrated in FIG. 11C. Specifically, in FIG. 11C, there are two base station apparatus 01 (10-1) and 02 (10-2) and terminals (1-1 to 1-4) coupled to the two base station apparatus 10, and there is illustrated a situation in which the communication of each of the terminals is interfering with the communication of the other terminals. The terminal apparatus 1-1 and 1-2 are coupled to the base station apparatus 01, and the terminal apparatus 1-3 and 1-4 are coupled to the base station apparatus 02 (10-2). Each base station apparatus 10 uses the same frequency band, and an independent scheduler allocates the wireless resource. Therefore, for example, the radio waves emitted by the terminal apparatus 1-3 are received not only by the base station apparatus 02 but also by the distant base station apparatus 01, and causes interference at that frequency. When the terminal apparatus 1-1 coupled to the base station apparatus 01 (10-1) is focused on, interference occurs when the same frequency is allocated to the terminal apparatus 1-1 as the frequency allocated to the terminal apparatus 1-3 coupled to the different base station apparatus 02. Therefore, in communication in which interference has occurred, error correction fails when only one transmission is performed, and a new resource for retransmission is allocated. As a result, as shown in FIG. 11A, a used resource 602-2 has an expanded probability distribution. Further, the same applies when attention is paid to the terminal apparatus 1-4 coupled to the base station apparatus 02 (10-2), and as shown in FIG. 11B, the probability distribution is like that of a used resource 602-3. Here, the total available resource amount is represented by 603-1, and is 201 illustrated in FIG. 4.

Figure 12:
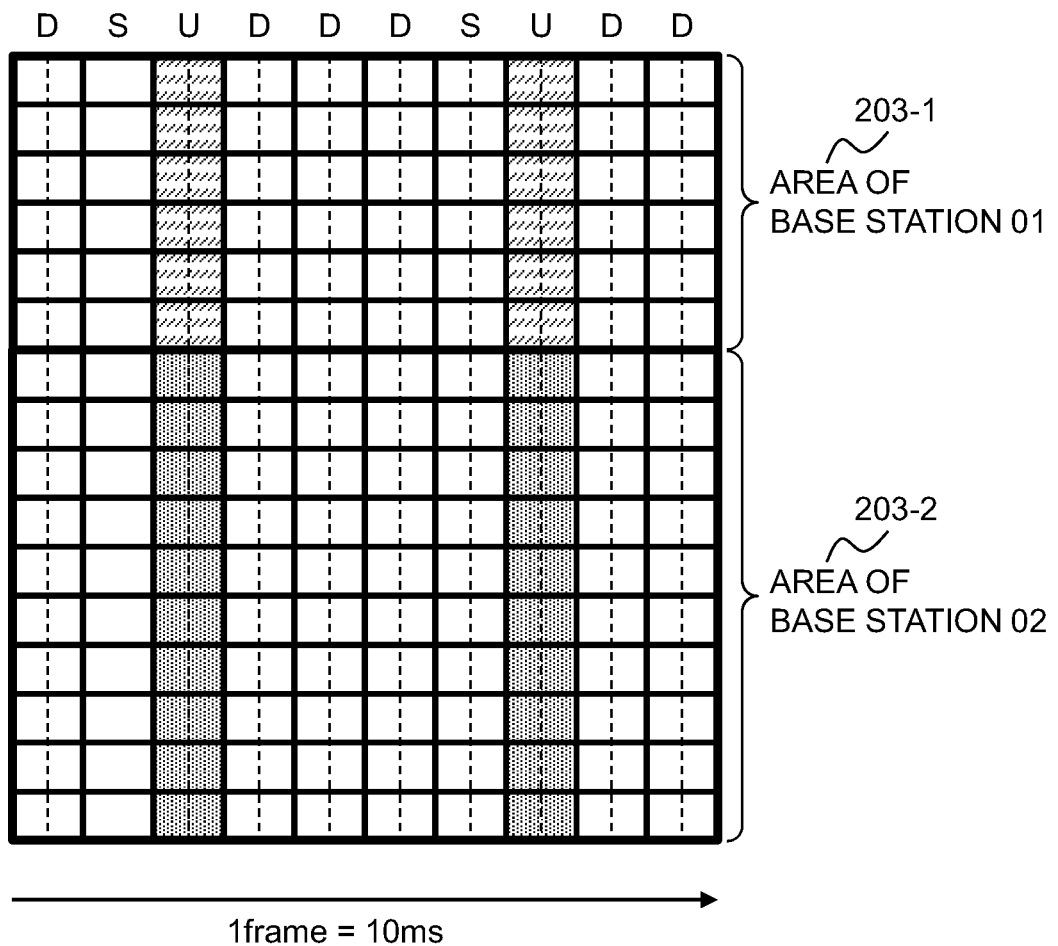
FIG. 12 is a diagram for illustrating the resource divided by frequency by a plurality of base stations in the first embodiment.

In LTE, a technology called "fractional frequency reuse" (FFR) is employed. As illustrated in FIG. 12, FFR is a method of reducing interference by, for example, dividing in advance a resource used by each of two base stations and preferentially determining an area. In FIG. 12, the vertical axis represents the frequency, and the area of the base station apparatus 01 and the area of the base station apparatus 02 are determined in advance. Based on such a division, the resource amount used due to the effect of interference on the uplink can be distributed, and a situation in which prediction becomes difficult can be suppressed. However, when the area is divided, the maximum amount of the resource that can be used by each base station becomes smaller, and therefore it is required to divide the resource by correctly estimating the resource amount required by each base station.

Figure 13A:
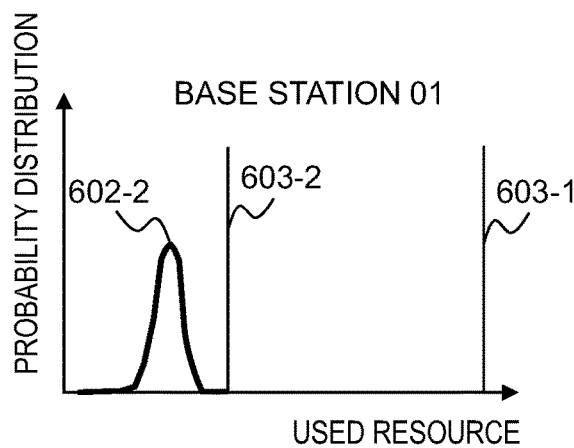
FIG. 13A, FIG. 13B, and FIG. 13C are diagrams for illustrating use of the resource divided by the plurality of base stations in the first embodiment.
Figure 13B:
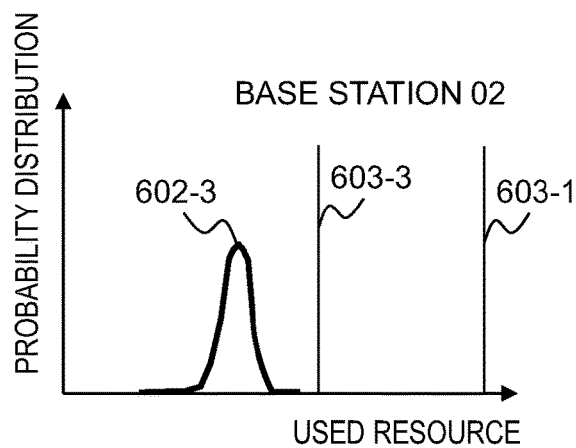
Figure 13C:
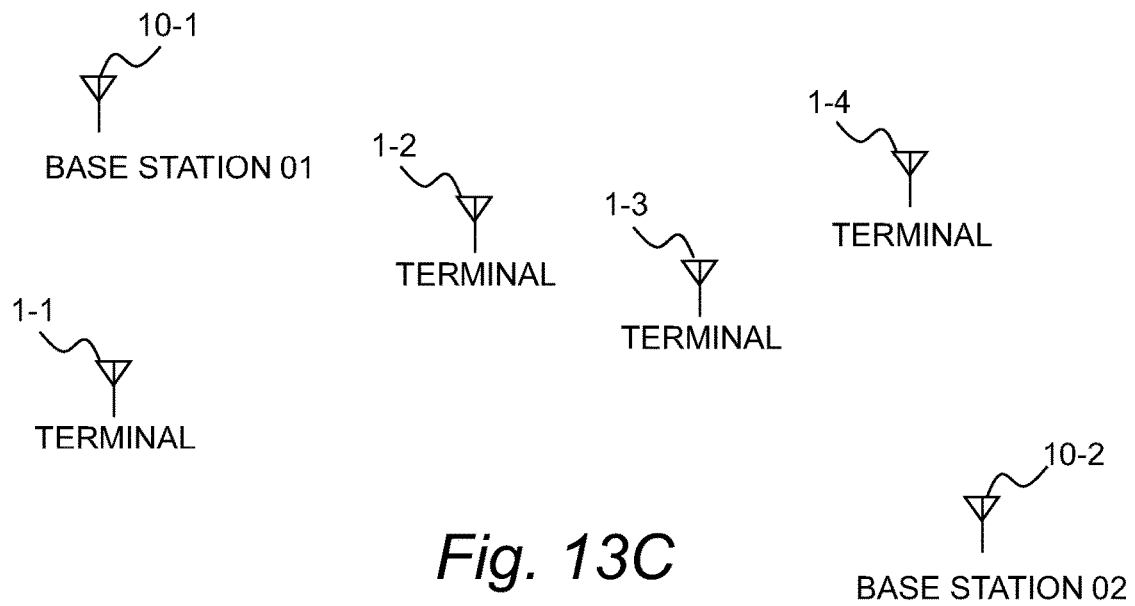

FIG. 13A to FIG. 13C show a resource used by dividing by FFR. The maximum amount of the resource that each base station can use is the amount 603-1, but the resource is divided and allocated to each base station by FFR. As illustrated in FIG. 13C, different frequencies are allocated to the terminal apparatus 1-1 and the terminal apparatus 1-2 coupled to the base station apparatus 01, and different frequencies are allocated to the terminal apparatus 1-3 and the terminal apparatus 1-4 coupled to the base station apparatus 02. Therefore, there is no influence between the terminals within the same base station. As a result, as shown in FIG. 13A, there is a reduction in the upper limit of the amount of the resource amount that can be used by each base station, as indicated by an upper limit 603-2 of the resource amount that can be used by the base station apparatus 01 and an upper limit 603-3 of the resource amount that can be used by the base station apparatus 02. However, as shown in FIG. 13B, the distribution of the used resource relating to the interference becomes smaller, and prediction becomes easier. As a result, it becomes possible to predict the current situation of the resource used as a whole, and it becomes easier to predict the available resource. As a result, the stability of the line can be predicted, and a problem of this invention can be solved.

Figure 14:
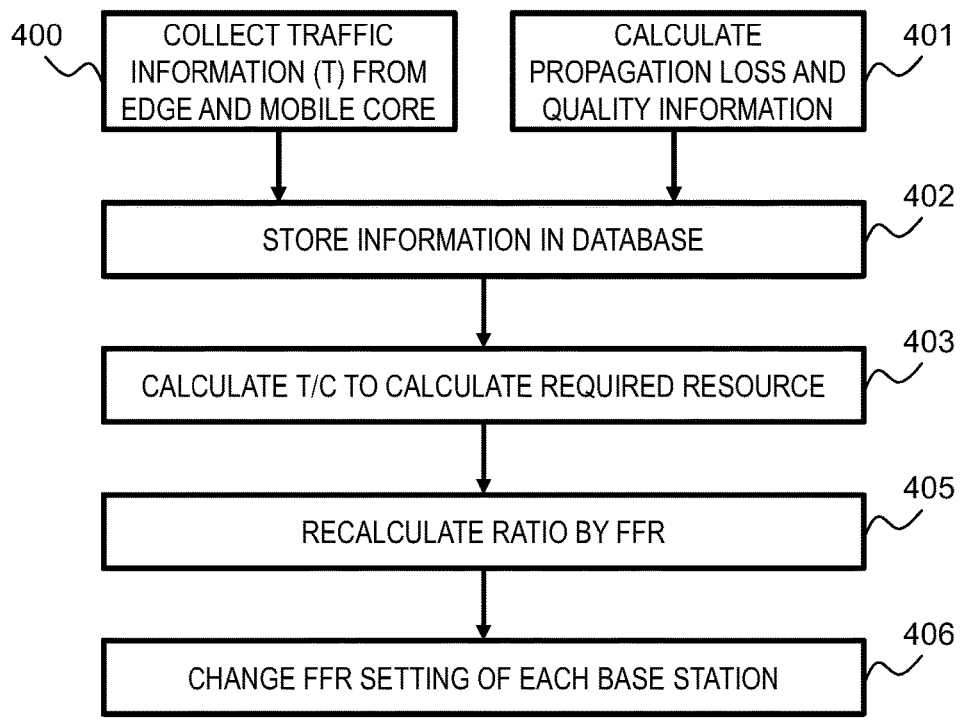
FIG. 14 is a flowchart for illustrating processing of predicting the future usage situation of the wireless resource when FFR is used in the first embodiment.

FIG. 14 is a flowchart for illustrating processing of predicting the future usage situation of the wireless resource when FFR is used. In FFR, the division of the frequencies to be allocated to each base station can be dynamically changed based on the current communication state. Similarly to the processing illustrated in FIG. 6, traffic information is acquired from the edge apparatus 30 and the mobile core apparatus 20 (Step 400). Further, the wireless simulator 60 calculates the propagation loss and the quality information (Step 401). The database 80 stores the calculated propagation loss and quality information (Step 402). For each base station, the total TIC for each coupled terminal is calculated to calculate the required resource (Step 403). The FFR division is determined from the resource amount required by each base station, and the resource amount allocated to each base station is calculated (Step 405). The FFR setting of each base station is changed (Step 406). Through this processing, the FFR division can be automatically set in accordance with the resource amount required by each base station, the operation can be performed in a low-interference situation, and the wireless usage can be stabilized.

Second Embodiment

Next, a second embodiment of this invention is described. In the second embodiment, parts and functions that are the same as those in the first embodiment are denoted by the same reference numerals, and description thereof may be omitted.

Figure 15:
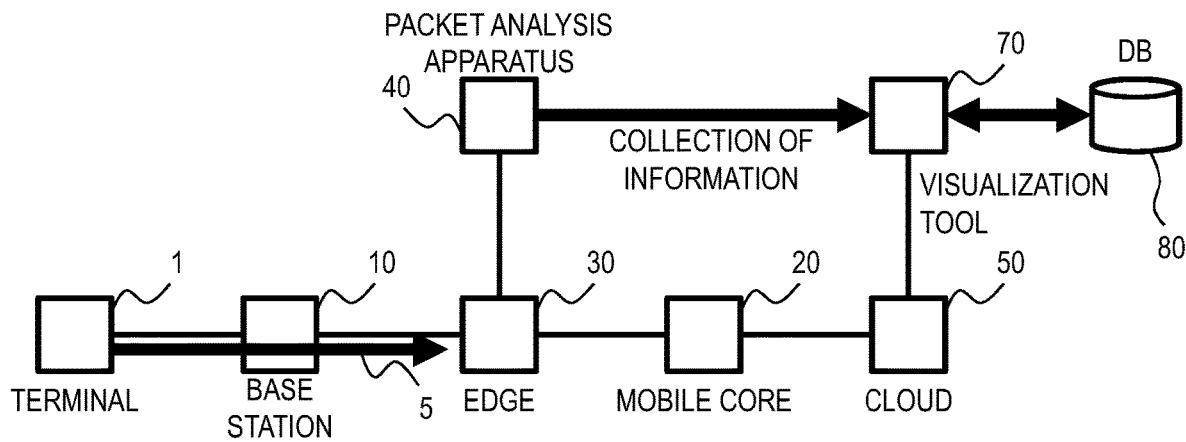
FIG. 15 is a diagram for illustrating a configuration of a communication system according to a second embodiment of this invention.

FIG. 15 is a diagram for illustrating a configuration of a communication system according to the second embodiment. In FIG. 15, an information source, for example, a camera 2, is mounted on the terminal apparatus 1. The information source mounted on the terminal apparatus 1 may be a sensor. Further, the terminal apparatus 1 has a function of transmitting a probe packet for measurement. Information from the terminal apparatus 1 is converted into a wireless signal and then transferred to the base station apparatus 10. The base station apparatus 10 is configured to convert the wireless signal into a wired electric signal, and to transfer the converted electric signal to the mobile core apparatus 20 via the edge apparatus 30. The edge apparatus 30 is configured to extract user data information by mirroring, and to transmit the extracted user data information to the packet analysis apparatus 40. The mobile core apparatus 20 is configured to convert user data into IP packets.

The IP packets created by the mobile core apparatus 20 are transmitted to the cloud 50 in accordance with a destination address of the packets, and a higher-level application performs arithmetic processing to provide a service. Meanwhile, the amount and the jitter of the user data mirrored by the edge apparatus 30 are analyzed by the packet analysis apparatus 40, and the analysis result is transmitted to the visualization tool 70. All of the information obtained from the packet analysis apparatus 40 is stored in the database 80.

The visualization tool 70 instructs, via the cloud 50, the specific terminal apparatus 1 to transmit a probe packet and instructs the other terminal apparatus 1 to temporarily stop transmitting a signal. During this time, a state in which only the signal 5 from the specific terminal apparatus 1 is transmitted to the base station apparatus 10 is created. The amount of packets mirrored by the edge apparatus 30 is analyzed by the packet analysis apparatus 40. When the amount of probe packets is large enough to use 100% of the wireless resource, all of the resource blocks are used within the temporary period during which the probe packet is transmitted. Therefore, the quality can be calculated from the value obtained by dividing the traffic by the total number of resource blocks.

Figure 16:
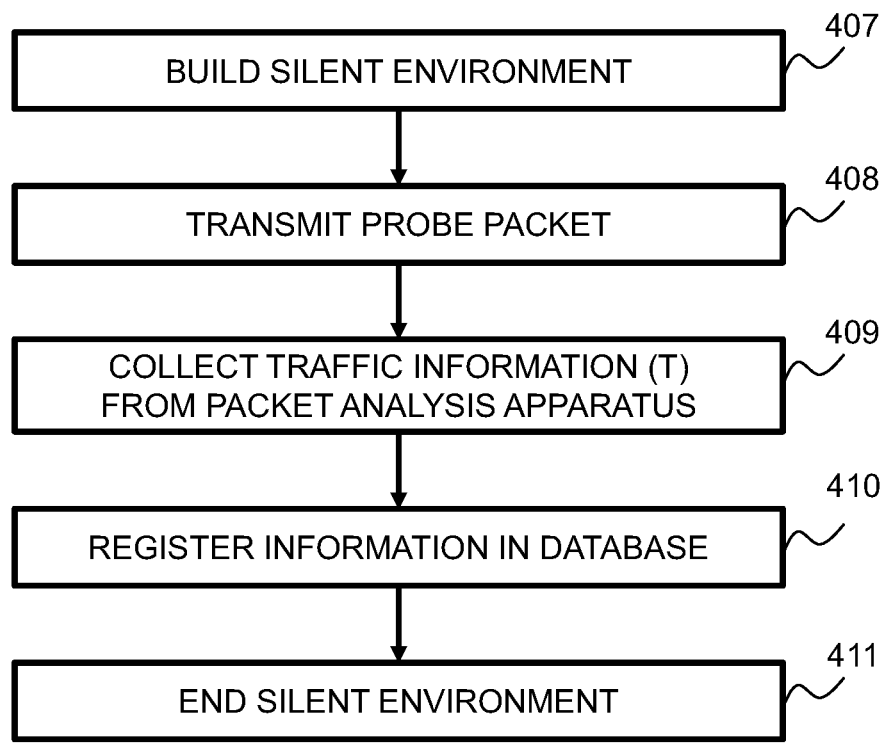
FIG. 16 is a flowchart for illustrating processing of measuring quality in the second embodiment.
Figure 17:
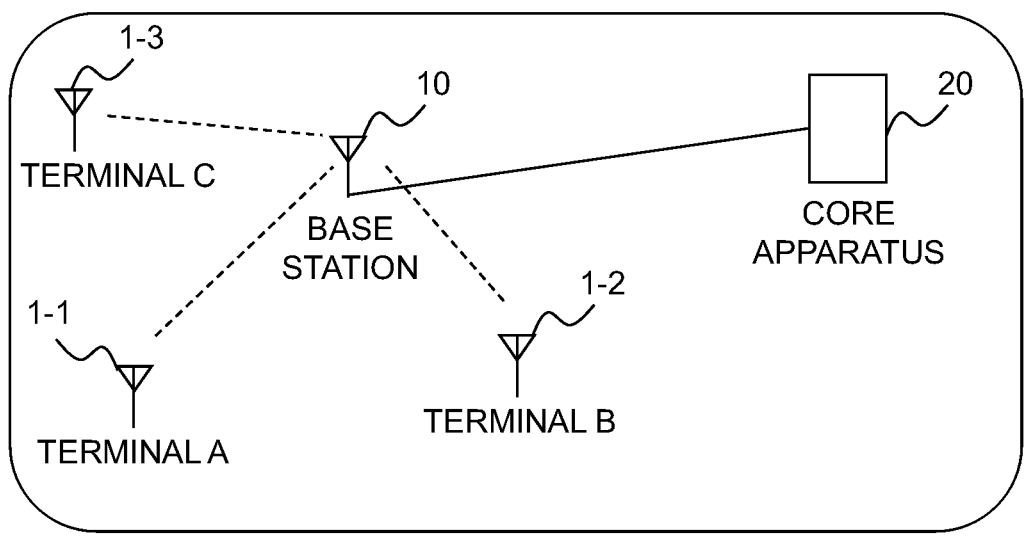
FIG. 17 is a diagram for illustrating a configuration of a related-art communication system.
Figure 18:
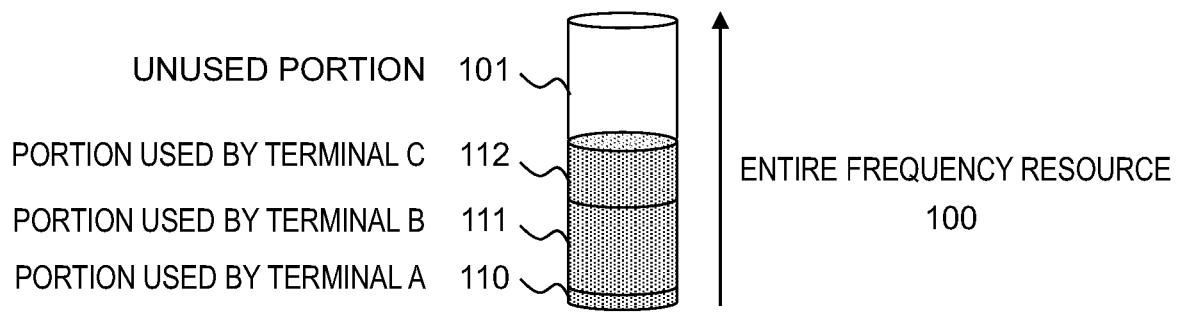
FIG. 18 is a diagram for illustrating the resource amount used wirelessly by a plurality of related-art terminals.
Figure 19:
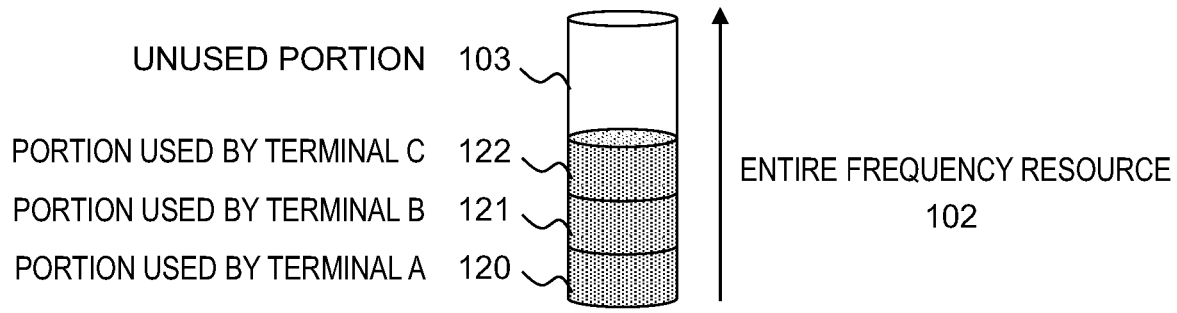
FIG. 19 is a diagram for illustrating the resource amount used in wired coupling by a plurality of related-art terminals.
Figure 20:
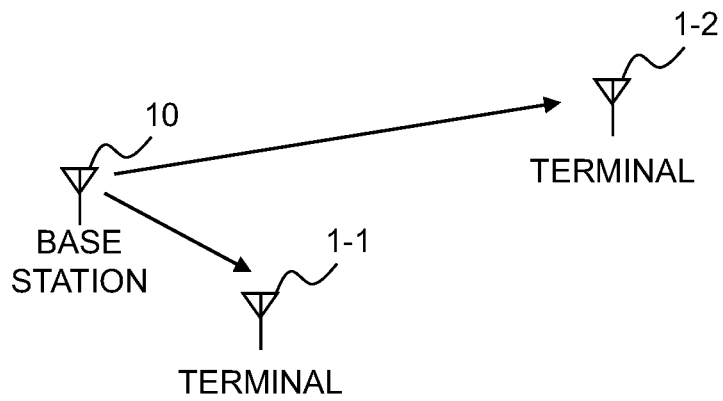
FIG. 20 is a diagram for illustrating a difference in quality of a related-art propagation path.
Figure 21:
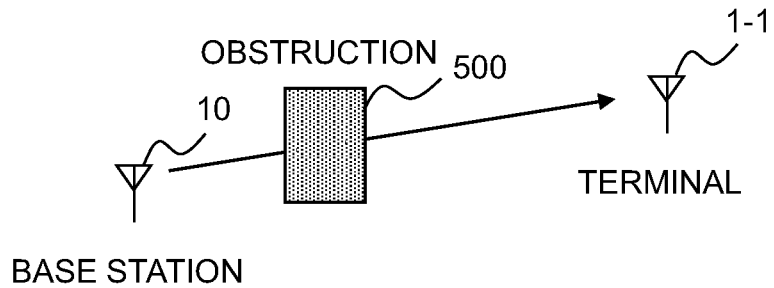
FIG. 21 is a diagram for illustrating a deterioration in quality of a related-art propagation path.
Figure 22:
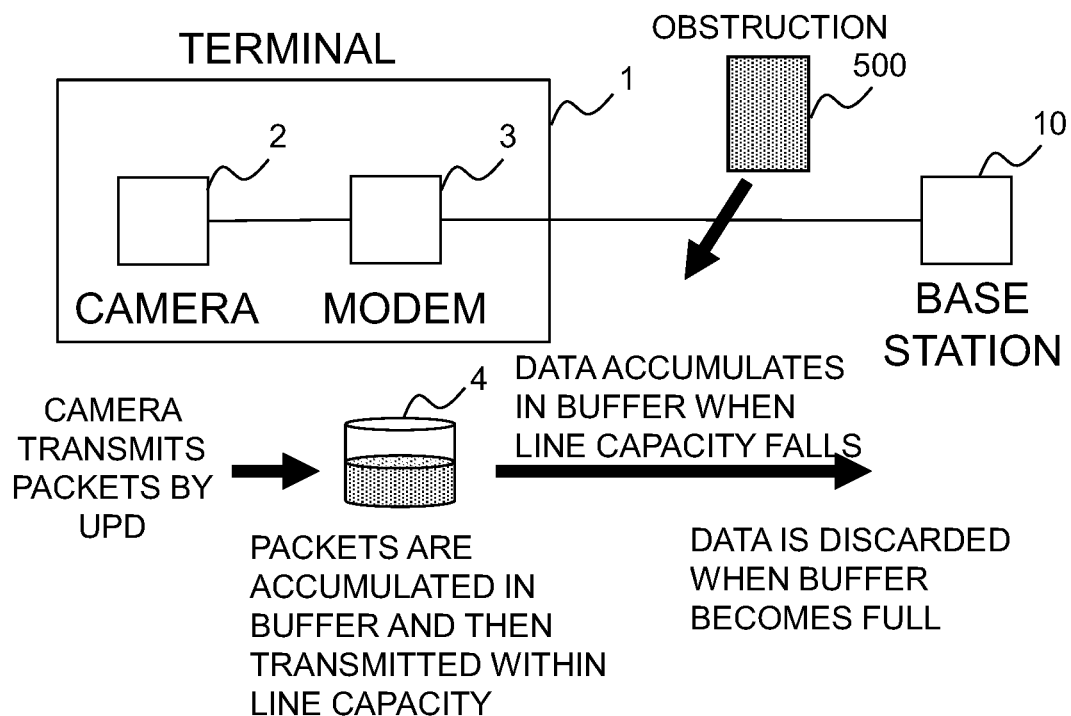
FIG. 22 is a diagram for illustrating a flow of data in a related-art uplink.

The flow for measurement is now described with reference to FIG. 16. First, the traffic of all terminal apparatus 1 coupled to a subject base station apparatus 10 is temporarily stopped to build a silent environment (Step 407). Then, one terminal to be measured is selected, and an instruction to transmit the probe packet is given. The terminal receives the probe packet transmission instruction, and transmits the probe packet (Step 408). The visualization tool 70 collects traffic information T from the packet analysis apparatus 40 (Step 409), and registers the collected information in the database 80 (Step 410). Then, the stop on traffic of all the stopped terminals is released, and the mode is returned to normal (Step 411).

In the second embodiment, under a state in which a silent environment has been built, by transmitting a sufficient amount of probe packets from a specific terminal to fully use a resource, it is possible to create a situation in which communication in a state in which all resource blocks are fully used is intentionally generated and the wireless quality can actually be measured. The measured quality is accumulated in the database 80, and can be used in place of the quality calculated by the wireless simulation described in the first embodiment. As a result, the resource used in accordance with the quality can be calculated based on the actual measurement. Therefore, a problem of this invention can be solved.

Lastly, a hardware configuration of the apparatus common to the first and second embodiments is described. The packet analysis apparatus 40, the wireless simulator 60, the visualization tool 70, and the database 80 of each embodiment of this invention are built from a computer system including a processor (central processing unit (CPU)), a storage apparatus, and a communication interface.

The processor executes a program stored in a memory. The memory includes a ROM, which is a non-volatile storage element, and a RAM, which is a volatile storage element. The ROM stores an unchanging program (for example, BIOS). The RAM is a dynamic random access memory (DRAM) or a similar high-speed volatile storage element, and temporarily stores a program to be executed by the processor and data to be used when the program is executed.

The storage apparatus is a large-capacity non-volatile storage apparatus, for example, a magnetic storage apparatus (an HDD) or a flash memory (an SSD). The storage apparatus stores data to be accessed when a program is executed. The storage apparatus may also store a program to be executed by the processor. The program in this case is read out from the storage apparatus, and is loaded onto the memory to be executed by the processor.

A program to be executed by the CPU is provided to the computer system via a removal medium (a CD-ROM, a flash memory, or the like) or a network, and is stored on the non-volatile storage apparatus, which is a non-transient storage medium. It is therefore preferred for the computer system to include an interface through which data is read out from a removable medium.

Each of the packet analysis apparatus 40, the wireless simulator 60, the visualization tool 70, and the database 80 may operate on one physical computer, or may operate on a virtual computer built from a plurality of physical resources in a computer system that includes a plurality of logically or physically configured computers.

As described above, a communication system of at least one embodiment of this invention includes: an access system including the base station apparatus 10 configured to wirelessly receive information from the terminal apparatus 1 and the edge apparatus 30 configured to copy at least a portion of user data from a signal received by the base station apparatus 10; a user data system including the mobile core apparatus 20 configured to receive via the edge apparatus 30 a signal transmitted from the base station apparatus 10; and a monitoring system including the packet analysis apparatus 40 configured to analyze traffic used by the terminal apparatus 1 from the user data copied by the edge apparatus 30, a wireless quality calculation module (visualization tool 70, packet analysis apparatus 40) configured to calculate a wireless quality between the base station apparatus 10 and the terminal apparatus 1, and a visualization unit (visualization tool 70) configured to visualize a usage situation of a wireless resource based on calculation using information collected from the packet analysis apparatus 40, the mobile core apparatus 20, and the wireless quality calculation module. The visualization unit 70 is configured to output data for displaying the usage situation of the wireless resource from an arrangement of the terminal apparatus 1, the calculated wireless quality, and the analyzed traffic. Therefore, by observing peripheral devices other than the base station apparatus, the quality of radio waves can be measured and an on-site communication manager can grasp whether or not stable wireless communication is possible. Further, the stability of wireless communication can be evaluated in consideration of the effect of a propagation loss. Moreover, a mechanism for indirectly measuring the quality of radio waves by observing peripheral devices other than the base station apparatus is required. In addition, in uplink communication, the distribution of the wireless resource amount can be determined based on the traffic and quality, and the wireless resource can be appropriately distributed. Therefore, stability can be ensured while improving the usage efficiency of the wireless line.

The wireless quality calculation module includes the wireless simulator 60 configured to calculate a future wireless quality between the base station apparatus 10 and the terminal apparatus 1 by using a three-dimensional model of a future environment, position information on the base station apparatus 10, and position information on the terminal apparatus 1. The visualization unit 70 is configured to output data for visualizing a current usage situation of the wireless resource and a future usage situation of the wireless resource. Therefore, the quality of radio waves at a defined operation site, for example, a factory, can be estimated from a propagation loss calculated by simulation, and the stability of wireless communication can be predicted before installation of the terminal apparatus 1 and the base station apparatus 10. Further, even after installation of the terminal apparatus 1 and the base station apparatus 10, the wireless quality can be measured and the stability of wireless communication can be visualized without adding a special function to the base station apparatus 10.

Further, during a silent period in which the terminal apparatus 1 temporarily stop transmission of packets, a specific terminal apparatus 1 executes a measurement mode of transmitting a dummy packet, and the wireless quality calculation module included in the packet analysis apparatus 40 is configured to measure the wireless quality by using the dummy packet. Therefore, the resource used in accordance with the quality can be calculated based on an actual measurement.

Further, the mobile core apparatus 20 is configured to control a parameter relating to a wireless resource scheduler so that the base station apparatus 10 do not use the same frequency as each other. Therefore, it becomes possible to predict the current situation of the resource used as a whole, and it becomes easier to predict the available resource. As a result, the stability of the line can be predicted.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A communication system, which is configured to collect information from a plurality of terminal apparatus, the communication system comprising:
   an access system including a base station apparatus configured to wirelessly receive information from the plurality of the terminal apparatus, and an edge apparatus configured to copy at least a portion of user data from a signal received by the base station apparatus;
   a user data system including a mobile core apparatus configured to receive via the edge apparatus a signal transmitted from the base station apparatus; and
   a monitoring system including a packet analysis apparatus configured to analyze traffic used by each of the plurality of the terminal apparatus from the user data copied by the edge apparatus, a wireless quality calculation unit module configured to calculate a wireless quality between the base station apparatus and each of the plurality of the terminal apparatus, and a visualization unit configured to visualize a usage situation of a wireless resource based on calculation using information collected from the packet analysis apparatus, the mobile core apparatus, and the wireless quality calculation module,
   the visualization unit being configured to output data for displaying the usage situation of the wireless resource from an arrangement of the plurality of the terminal apparatus, the calculated wireless quality, and the analyzed traffic,
   wherein the wireless quality calculation module includes a wireless simulator configured to calculate a future wireless quality between the base station apparatus and each of the plurality of the terminal apparatus by using a three-dimensional model of a future environment, position information on the base station apparatus, and position information on each of the plurality of the terminal apparatus, and
   wherein the visualization unit is configured to output data for visualizing a current usage situation of the wireless resource and a future usage situation of the wireless resource.

2. The communication system according to claim 1, wherein the mobile core apparatus is configured to control a parameter relating to a wireless resource scheduler so that a plurality of the base station apparatus avoid using the same frequency as each other.

3. A communication system, which is configured to collect information from a plurality of terminal apparatus, the communication system comprising:
   an access system including a base station apparatus configured to wirelessly receive information from the plurality of the terminal apparatus, and an edge apparatus configured to copy at least a portion of user data from a signal received by the base station apparatus;
      a user data system including a mobile core apparatus configured to receive via the edge apparatus a signal transmitted from the base station apparatus; and
      a monitoring system including a packet analysis apparatus configured to analyze traffic used by each of the plurality of the terminal apparatus from the user data copied by the edge apparatus, a wireless quality calculation module configured to calculate a wireless quality between the base station apparatus and each of the plurality of the terminal apparatus, and
      a visualization unit configured to visualize a usage situation of a wireless resource based on calculation using information collected from the packet analysis apparatus, the mobile core apparatus, and the wireless quality calculation module,
   the visualization unit being configured to output data for displaying the usage situation of the wireless resource from an arrangement of the plurality of the terminal apparatus, the calculated wireless quality, and the analyzed traffic,
   wherein, a specific one of the plurality of the terminal apparatus executes a measurement mode of transmitting a dummy packet during a silent period in which the plurality of the terminal apparatus temporarily stop transmission of packets, and
   wherein the wireless quality calculation module included in the packet analysis apparatus is configured to measure the wireless quality by using the dummy packet.

4. A method of managing communication in a communication system,
   the communication system having an access system including a plurality of the terminal apparatus which are transmission sources of information, a base station apparatus configured to wirelessly receive information from the plurality of the terminal apparatus, and an edge apparatus configured to copy at least a portion of user data from a signal received by the base station apparatus;
   a user data system including a mobile core apparatus configured to receive via the edge apparatus a signal transmitted from the base station apparatus, and a computer configured to receive the user data to perform processing by using an application; and
   a monitoring system including a packet analysis apparatus configured to analyze the user data copied by the edge apparatus, a wireless quality calculation module configured to calculate a wireless quality between the base station apparatus and each of the plurality of the terminal apparatus, and a visualization unit configured to visualize a usage situation of a wireless resource based on calculation using information collected from the packet analysis apparatus, the mobile core apparatus, and the wireless quality calculation module,
   the communication management method comprising steps of:
   analyzing, by the packet analysis apparatus, traffic used by each of the plurality of the terminal apparatus from the user data;
   calculating, by the wireless quality calculation module, the wireless quality between the base station apparatus and each of the plurality of the terminal apparatus; and
   outputting, by the visualization unit, data for displaying the usage situation of the wireless resource from an arrangement of the plurality of the terminal apparatus, the calculated wireless quality, and the analyzed traffic,
   wherein the wireless quality calculation module includes a wireless simulator configured to calculate a future wireless quality between the base station apparatus and each of the plurality of the terminal apparatus by using a three-dimensional model of a future environment, position information on the base station apparatus, and position information on each of the plurality of the terminal apparatus, and wherein the communication management method further comprises a step of outputting, by the visualization unit, data for visualizing a current usage situation of the wireless resource and a future usage situation of the wireless resource.

5. The communication management method according to claim 4 further comprising:
a step of executing, by a specific one of the plurality of the terminal apparatus, a measurement mode of transmitting a dummy packet during a silent period in which the plurality of the terminal apparatus temporarily stop transmission of packets; and
a step of measuring, by the wireless quality calculation module included in the packet analysis apparatus, the wireless quality by using the dummy packet.

6. The communication management method according to claim 4 further comprising a step of controlling, by the mobile core apparatus, a parameter relating to a wireless resource scheduler so that a plurality of the base station apparatus avoid using the same frequency as each other.

* * * * *